No. 731,101. PATENTED JUNE 16, 1903.
G. FECKER.
TELESCOPE.
APPLICATION FILED NOV. 25, 1901.
NO MODEL.
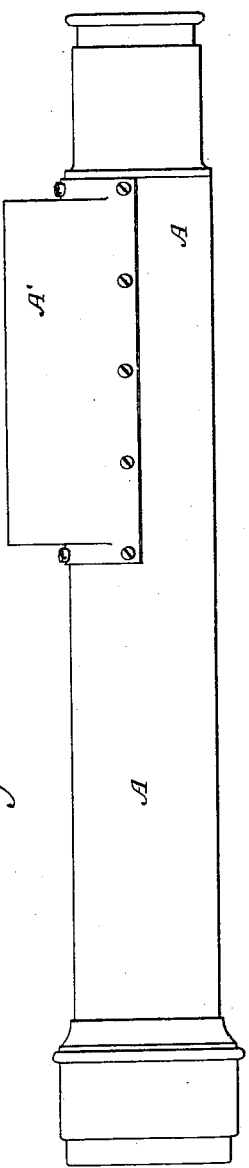
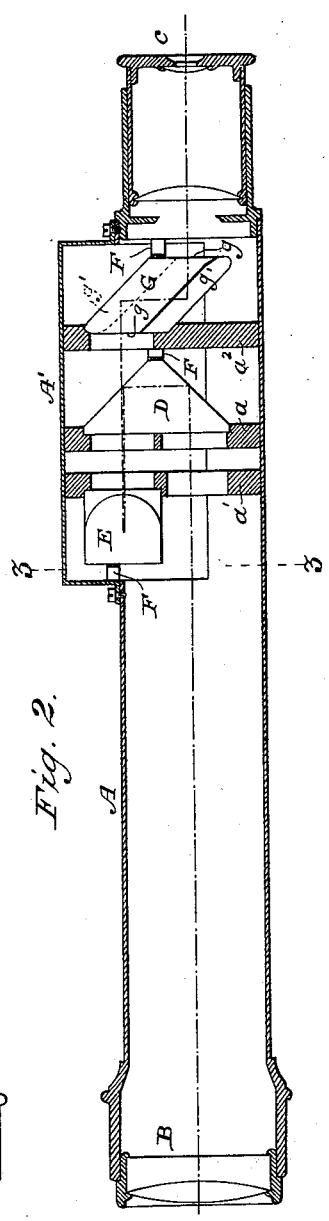
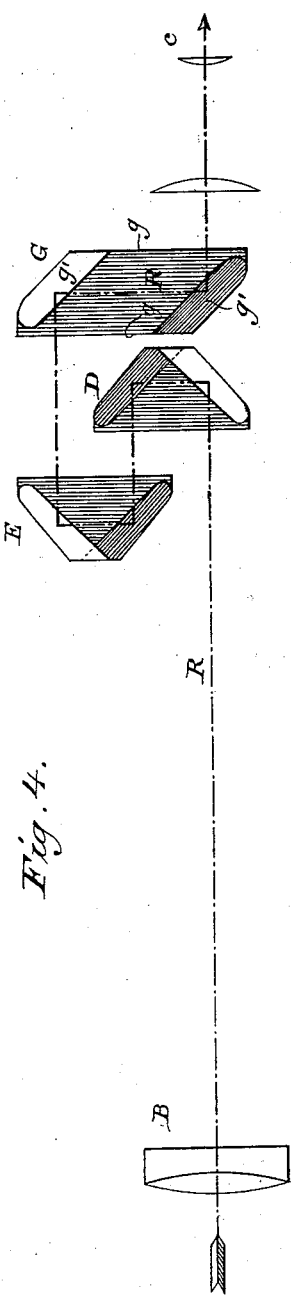
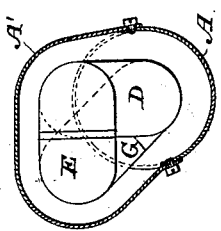
WITNESSES:
H. M. Wise.
N. Brennan.
INVENTOR:
Gottlieb Fecker,
by his attorneys
Thurston & Bates.

No. 731,101. Patented June 16, 1903.

UNITED STATES PATENT OFFICE.

GOTTLIEB FECKER, OF CLEVELAND, OHIO, ASSIGNOR TO THE WARNER AND SWASEY COMPANY, OF CLEVELAND, OHIO, A CORPORATION OF OHIO.

TELESCOPE.

SPECIFICATION forming part of Letters Patent No. 731,101, dated June 16, 1903.

Application filed November 25, 1901. Serial No. 83,503. (No model.)

*To all whom it may concern:*

Be it known that I, GOTTLIEB FECKER, a citizen of the United States, residing at Cleveland, in the county of Cuyahoga and State of Ohio, have invented a certain new and useful Improvement in Telescopes, of which the following is a full, clear, and exact description, reference being had to the accompanying drawings.

In telescopes as heretofore constructed it has been customary to employ the so-called "Porro" prisms for the purpose of inverting the image, so that celestial lenses could be used in place of the less efficient terrestrial-lens arrangement, which itself preserves the image upright. Such Porro-prism instruments, however, have been unsatisfactory for several reasons. In the first place the construction is very expensive, because the instrument includes two independently-constructed barrels, and such barrels must when the parts of the instrument are assembled be connected with an intermediate piece—the prism-case—in such wise that their axes are absolutely parallel and are at right angles to the planes in which the bases of the prisms lie. Moreover, the instruments are not popular with the users, because they are unsightly in appearance and are exceedingly inconvenient to use.

The object of my invention is to produce a telescope employing Porro prisms and having all the desirable characteristics due to such prisms, but which is not objectionable for any of the reasons above set forth.

The invention consists, primarily, in constructing a Porro-prism telescope having substantially a continuous alined barrel from the eyepiece to the objective end of the barrel. In bringing about this result I employ in connection with the two triangular Porro prisms a third prism having its opposite transverse faces in planes at right angles to the axis of the telescope and having parallel oblique end faces, said prism being so placed that one of its inclined faces shall span the barrel of the instrument and the other span the paths of the light-rays passing to or from the Porro prisms, whereby said light-rays will enter the objective end of the instrument and will leave the eyepiece end thereof in the same right line.

It also consists in the telescope containing such a prism and having certain characteristics of construction, notably a single barrel extending from the objective end to the eyepiece end of the instrument, made possible by the use of said prism, whereby the instrument may be more easily and cheaply made and will be more convenient to use and more pleasing in appearance.

In the drawings, which clearly disclose my invention, Figure 1 is a side elevation of the telescope, and Fig. 2 is a longitudinal central section thereof. Fig. 3 is a transverse section on the line 3 3 of Fig. 2. Fig. 4 is a diagram illustrating the path of the rays of light through the telescope.

Referring to the parts by letters, A represents a continuous barrel of ordinary construction, except that at some suitable point within its length one side is cut away, and a box or prism-casing A' is secured over said opening, thereby laterally enlarging the instrument. The objective lens B is secured in the usual manner to one end of the barrel, and the adjustable eyepiece $c$ is mounted in the usual manner to the other end of the barrel. Within that part of the instrument where said lateral enlargement is found are transverse seats $a$, $a'$, and $a^2$, against which the prisms D, E, and G are severally held by any suitable means—as, for example, the springs F. The prisms D and E are the so-called "Porro" prisms, and they are placed in the usual relationship to each other and to the objective end of the instrument.

The light-rays entering the objective end of the instrument follow the path indicated by the line R and are deflected, as shown, by the two triangular prisms D and E. The prism G has two parallel transverse faces $g$ $g$, through which the light-rays pass at right angles to the planes of said faces in entering and leaving said prism. It has also two inclined parallel reflecting end faces $g'$ $g'$, by which the light-rays are deflected substantially as shown by the line R. This prism is so placed that one of said inclined faces $g'$ extend across the possible path of the light-rays, leaving the prism E, and the other inclined face $g'$ extends across the field of vision in the barrel A. The result of primary importance due to the use, as described, of the prism G is that the several rays enter the objective end and leave the eyepiece end in alinement and that therefore the instrument can be constructed in the form and manner shown. Incidentally the path traveled by each light-ray is longer by the distance between the inclined reflecting-faces of the prism G than it would be if such prism had not been employed.

Having described my invention, I claim—

1. A telescope containing two Porro prisms and a third prism having two faces lying in parallel planes at right angles to the axis of the telescope and having two parallel oblique reflecting-faces whereby the rays of light entering at the objective end and passing out at the eyepiece end of the instrument will lie in the same right line, substantially as described.

2. In a telescope, the combination with a continuous barrel, of a casing secured to the outside of said barrel, two Porro prisms arranged in said barrel and said casing, and a third prism having two faces lying in parallel planes at right angles to the axis of the telescope and having two parallel oblique reflectory faces by which the light-rays entering at the objective end of the instrument and those passing out at the eyepiece end will lie in the same right line, substantially as described.

3. The combination of a continuous longitudinal barrel having at one end an objective lens and at the other an eyepiece, a pair of oppositely-facing Porro prisms within the barrel, and a third prism adapted to bring the rays of light entering at the objective end and those passing out of the eyepiece end into the same right line, substantially as described.

4. In a telescope, the combination of a barrel having an objective lens at one end and an eyepiece at the other, a Porro prism extending into the line connecting said lenses, a second Porro prism out of said line but overlapping the line of rays of the first-mentioned prism, and a third prism having two similarly-inclined faces and bridging the distance from the rays of the second-mentioned prism to the line connecting the eyepiece and objective, substantially as described.

5. In a telescope, the combination of a continuous barrel, a prism-casing secured to one side of the same and making an enlargement of the barrel thereat, a pair of oppositely-facing Porro prisms located in said barrel and in said casing, and a third Porro prism having a pair of parallel faces and located both in said barrel and said casing and bridging the distance across the two prisms first mentioned, substantially as described.

In testimony whereof I hereunto affix my signature in the presence of two witnesses.

GOTTLIEB FECKER.

Witnesses:
ALBERT H. BATES,
H. M. WISE.